July 17, 1923.
J. W. WHITE
1,462,467
DRAG LINK AND PROCESS OF MAKING SAME
Filed Dec. 4, 1920
2 Sheets-Sheet 1
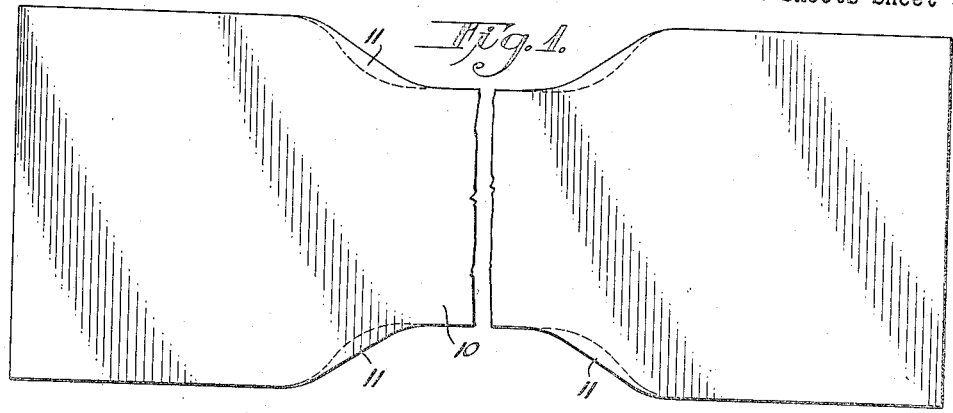
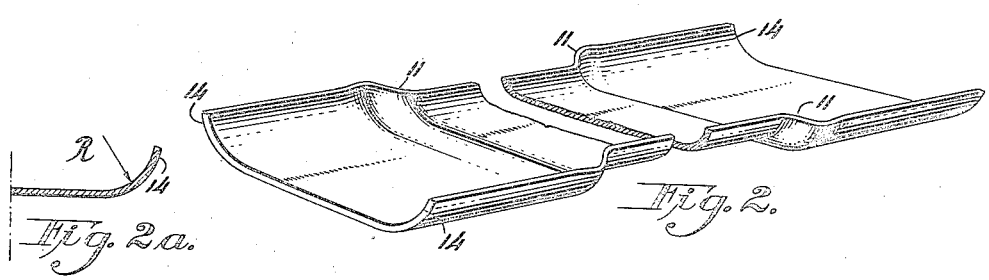
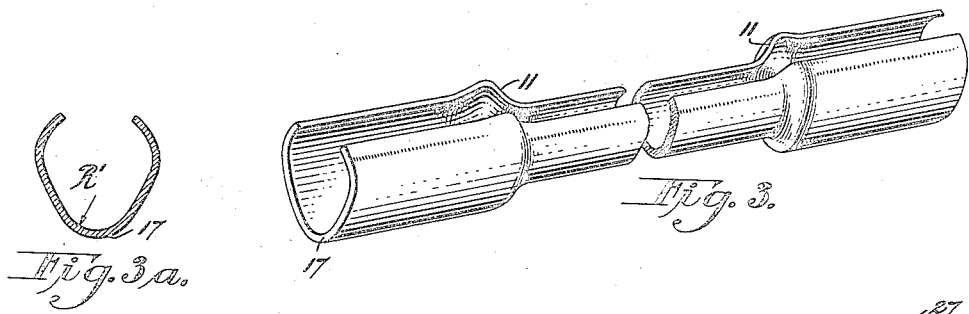
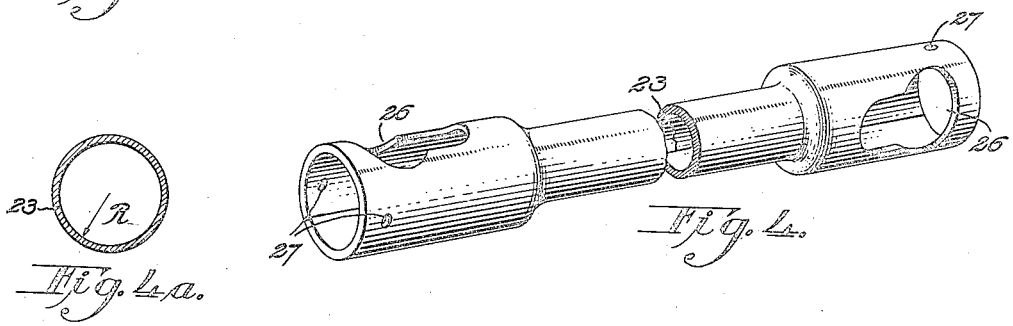
Witness:
G. L. Perua
Inventor
John W. White
By his Attorneys
Blackmore, Spencer & Flint July 17, 1923.  1,462,467
J. W. WHITE
DRAG LINK AND PROCESS OF MAKING SAME
Filed Dec. 4, 1920  2 Sheets-Sheet 2
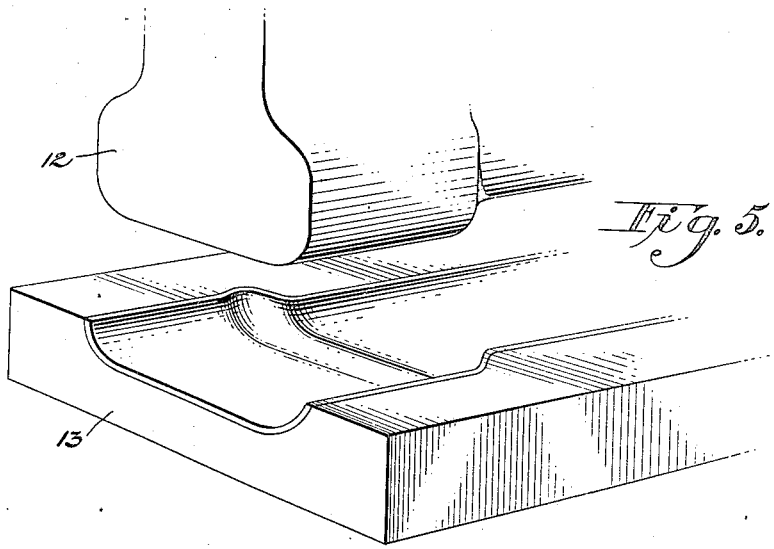
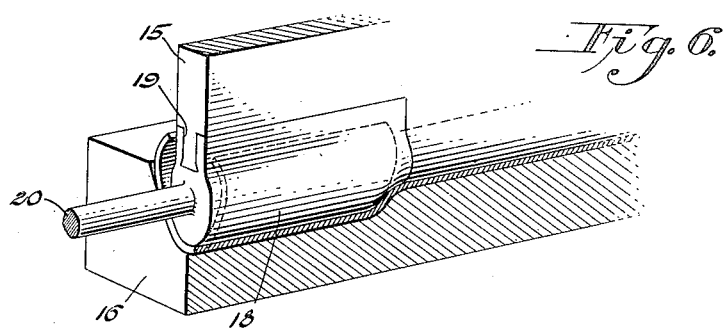
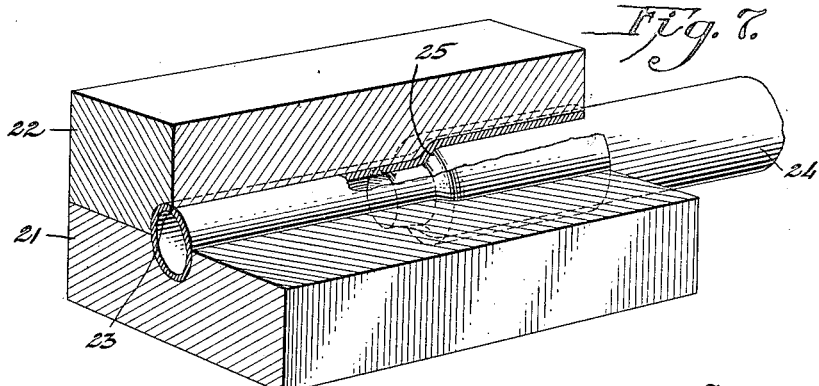

Patented July 17, 1923.

1,462,467

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

DRAG LINK AND PROCESS OF MAKING SAME.

Application filed December 4, 1920. Serial No. 428,291.

*To all whom it may concern:*

Be it known that I, JOHN W. WHITE, a citizen of the United States, and a resident of Detroit, county of Wayne, and State of Michigan, have invented certain new and useful Improvements in Drag Links and Processes of Making Same, of which the following is a full, clear, concise, and exact description, such as will enable others skilled in the art to which the invention relates to make and use the same, reference being made therein to the accompanying drawings, which form a part of this specification.

The invention relates to tubular rods or links and more particularly to connecting rods for the steering gear of automobiles, such connecting rods being commonly termed drag links, also to a process of making drag links or similarly shaped tubular members.

The link ordinarily employed for connecting an arm on the steering shaft to the steering knuckle on the axle spindle is usually of tubular form comprising two end portions of sufficient internal diameter to accommodate ball joints and an intermediate portion of reduced diameter, the several portions being cylindrical and co-axial. It has been common practice to make these links of a plurality of sections connected in various ways as by welding, screw threading, riveting, etc. Inasmuch as the breakage or failure of a part of the steering gear is likely to result in serious accidents it is of the greatest importance that the links be so constructed as to eliminate as far as possible the liability to failure or breakage.

One object of the invention, therefore, is to provide a drag link and process of making the same whereby the link may be formed from a single piece of sheet metal, thus eliminating entirely any joints transversely of the link itself.

A further object is to simplify and cheapen the manufacture of links of this character or of tubular members having similar portions of enlarged diameter.

A further object is the provision of an improved method whereby a sheet metal blank may be shaped accurately into tubular form by the use of dies.

A further object is the provision of means whereby a tubular drag link or similar article may be formed by die-pressing operations and whereby the edges of the blank may be brought accurately into juxtaposition at the completion of the shaping operations.

With the above and other objects in view, as will appear more fully from the following description, the invention consists in the features of novelty herein described, together with such variations thereof as fall within the scope of the appended claims.

In the accompanying drawings, in which is illustrated a drag link formed in accordance with my invention, together with means for carrying out the process whereby the said link is formed—

Fig. 1 is a plan view of a blank which may be cut from sheet metal;

Fig. 2 is a perspective view of the blank after having been subjected to a first shaping operation;

Fig. 2ª is a cross-section of the blank at the stage represented in Fig. 2;

Fig. 3 is a perspective view of the blank after a second shaping operation;

Fig. 3ª is a cross-section of the blank at the stage represented in Fig. 3;

Fig. 4 is a perspective view of a drag link in completed form, so far as the die shaping operations are concerned;

Fig. 4ª is a cross-section of the completely shaped link; and

Figs. 5, 6 and 7 are perspective views showing means for performing the operations required to produce the articles shown respectively in Figs. 2, 3 and 4.

In the drawings, 10 indicates a flat blank which may be cut in any desired manner from sheet metal of suitable thickness. The end portions of the blank are wider than the intermediate portions, as shown in Fig. 1, and the blank, as a whole, is in plan a development in a single plane of the finished link shown in Fig. 4, with the exception of the points at the juncture of the intermediate and end portions. At these points, for a reason to be explained later, a small area of metal is provided in addition to that which would constitute merely a development of the finished link, these areas being shown at 11 between the dotted lines and the full lines in Fig. 1.

The steps by which the blank shown in Fig. 1 is formed into the completed tubular article shown in Fig. 4 may be varied somewhat in practice, but will include preferably the three operations hereinafter described.

In the first operation the flat blank is subjected to pressure between suitable dies, as, for example, the dies 12, 13, of Fig. 5. These dies will operate to bend the longitudinal edges 14 of the blank into a curved form which constitutes in cross section substantially the quadrant of a circle, the radius of which, as indicated at R in Fig. 2$^a$, is approximately the raduis of the corresponding portion of the completed rod or link. These dies also depress the end portions of the blank below the plane of the intermediate portion, as shown in the drawing, thereby forming a shoulder at the juncture between the intermediate and end portions. At this stage of the formation of the blank the metal constituting the portions 11 will rise above the plane of the edges of the other portions of the blank.

In the second step of the shaping process the partially formed blank shown in Fig. 2 is operated upon by die members such as are shown at 15, 16, in Fig. 6. These dies operate only upon the portions of the blank adjacent to its longitudinal medial line and bend the blank into the trough-shaped form shown in Fig. 3. The medial meeting faces of the die members are formed preferably upon a radius which is less than that of the completed tubular rod or link, the blank being thereby shaped at its central portion 17 upon a corresponding radius as indicated at R' in Fig. 3$^a$, the radius R' being somewhat less than the radius R, shown in Figs. 2$^a$ and 4$^a$.

In order to provide for the removal of the blank from the die members 15, 16, since at this stage of the formation the end portions of the male die may be of greater diameter than the intermediate portion of the blank, the die member 15 may be formed in sections, one end portion 18 being joined to the main portion of the die by a slidable connection, as indicated at 19, and suitable means, as shown at 20, being provided for the removal of the section 18, whereupon the blank may be withdrawn endwise from between the remaining portions of the die members.

The third shaping operation comprises the placing of the partially formed blank shown in Fig. 3 between die members such as are illustrated at 21, 22, in Fig. 7, the opening between these die members being preferably of truly circular outline. These dies operate upon the exterior only of the blank and act to compress the trough-shaped blank of Fig. 3 into annular cross section as indicated in Fig. 4$^a$. In this operation the longitudinal medial portion of the blank, which has already been formed upon a radius slightly less than that of the finished tube, is bent outwardly. The effect of this latter operation is to give the edges of the blank which have been brought together at 23 a tendency to remain together owing to the resilience of the section immediately opposite the joint, which section retains a tendency to return to a radius less than that of the finished tube.

A further operation may be performed upon the rod while it is held in the die members 21, 22, comprising the truing up of the enlarged ends by the insertion of a plug or mandrel 24, said mandrel having a shouldered portion 25 and corresponding accurately to the desired dimensions of the interior of the enlarged ends of the rod or link. By applying force axially to this mandrel the interior of the rod may be accurately sized and the shouldered portions thereof may be properly formed between the shouldered portion 25 of the mandrel and the correspondingly shaped die members.

I have found that the foregoing operations, if performed upon a flat blank corresponding exactly in plan to a development of the finished link, will result in a link having a slight aperture between the edges where the enlarged end portions join the intermediate portion, owing to the inability of the metal to stretch freely throughout the entire width of the blank. In order to obviate this defect, I provide in the blank the additional metal comprised in the portions 11 referred to above. By the provision of this additional area in the blank, I am able to produce a finished link in which the edges meet accurately throughout the entire length of the link.

After the shaping operations have been completed, the meeting edges may be joined by any suitable welding or brazing operation, as, for example, by the electric welding process employing a metallic electrode, commonly designated the Slavianoff process. The welding together of the edges effectually prevents the spreading of the joint under any normal strains incident to the use of the link.

Openings of the form usually present in drag links and indicated at 26, 27, may be provided to accommodate the members which are to be connected by the link, which openings may be formed, if desired, in whole or in part before the shaping operations are completed, as, for example, by stamping operations performed upon the flat blank. The ends may be provided also with internal screw threads in the usual manner to receive screw plugs.

It will be seen that the link formed in accordance with my process is without transverse joints and, therefore, presents no weakened portions liable to failure by subjection to the strains due either to tension or compression occurring in actual use. Being made from a single piece of sheet metal formed into a practically seamless tube, it is strong and rigid without being unduly heavy, and is particularly free from liability to fracture when employed as a connecting rod.

It will be appreciated that the process above described will be equally applicable in the production of articles in which one end only or an intermediate portion is of enlarged diameter, and that certain features of the invention are applicable also to the formation by die-shaping operations of a tube of uniform diameter.

While I have described herein what I now regard as the preferred form of my invention, it will be understood that various changes in details may be made without departing from the spirit and scope thereof and, therefore, I do not wish to be limited to the specific steps or structure above set forth except as required by the language of the appended claims.

I claim:

1. A connecting rod comprising cylindrical end portions and a cylindrical, intermediate portion of less diameter than said end portions, said end and intermediate portions being formed from a single piece of sheet metal corresponding, substantially, with the length of the finished rod and bent to tubular form about axes extending longitudinally of said piece; said single piece of sheet metal having its edges connected by a welded joint.

2. A process of making a connecting rod comprising the preparation of a sheet metal blank wider at its end portions than at the intermediate portion, bending said blank into tubular form, and joining the longitudinal edges.

3. A process of forming a tubular member circular in cross section from sheet metal comprising subjecting a sheet metal blank wider at its end portions than at the intermediate portion first to a bending operation adjacent the edges, then to a bending operation intermediate the said edges, and finally to an external compression to complete the formation of the tube.

4. A process of making tubular connecting rods comprising first forming a sheet metal blank having end portions wider than the intermediate portion, offsetting said end portions from the plane of the intermediate portion, bending the longitudinal edge portions of said blank upon radii approximately those of the corresponding portions of the finished rod, then bending the portion intermediate said edges upon radii less than those of the finished rod, then compressing the blank to bring the edges together, and welding said edges electrically.

5. A process of making a tubular member having a portion of enlarged diameter, comprising, first forming a sheet metal blank having a widened portion corresponding to the enlarged portion aforesaid, then shaping the blank to trough form by dies, and finally completing the shaping to tubular form by external compression.

6. A process of making a tubular member having a portion of enlarged diameter, comprising, first forming a sheet metal blank having a widened portion corresponding to the enlarged portion aforesaid, then bending the blank to trough form by shaping in successive steps the edge portions and the intermediate portion, and finally completing the shaping to tubular form by external compression.

7. A process of making a tubular member having an end portion of enlarged diameter comprising the forming of a sheet metal blank having a wider portion corresponding to the enlarged portion of the member, shaping the blank into trough form by dies, completing the shaping to tubular form by external compression, and truing up the enlarged portion by internally applied means.

8. A sheet metal blank for the manufacture of a tubular connecting rod or the like having a portion of enlarged diameter, said blank comprising a narrower portion and a wider portion corresponding respectively to the portions of lesser and greater diameter in the finished rod, metal being provided at the juncture of the wider and narrower portions in excess of that required to constitute a development in a plane of the finished rod.

9. A link for use in motor vehicle steering gear, comprising a single piece stamping formed up to provide a rod portion having a closed but hollow section and an integral tubular head portion at the end and of larger diameter.

10. A link for use in motor vehicle steering gear, comprising a single piece formed into a rod portion of closed but hollow cross section and a head portion of tubular character the edges of the piece being secured together.

In testimony whereof I affix my signature.

JOHN W. WHITE.